(12) United States Patent
Itoh et al.

(10) Patent No.: US 7,144,847 B2
(45) Date of Patent: Dec. 5, 2006

(54) DETERGENT

(75) Inventors: Mikihiko Itoh, Yokohama (JP); Kazuyuki Hamada, Yokosuka (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 8 days.

(21) Appl. No.: 10/450,137

(22) PCT Filed: Dec. 5, 2001

(86) PCT No.: PCT/JP01/10637

§ 371 (c)(1),
(2), (4) Date: Jun. 12, 2003

(87) PCT Pub. No.: WO02/47883

PCT Pub. Date: Jun. 20, 2002

(65) Prior Publication Data

US 2004/0023823 A1    Feb. 5, 2004

(30) Foreign Application Priority Data

Dec. 13, 2000  (JP) .............................. 2000-378444

(51) Int. Cl.
    *C11D 17/00*  (2006.01)
(52) U.S. Cl. .................. 510/162; 510/163; 510/170; 510/199; 510/219; 510/164; 510/406; 510/407; 510/411; 510/463; 510/505
(58) Field of Classification Search ............... 510/163, 510/164, 175, 176, 201; 134/42
See application file for complete search history.

(56) References Cited

U.S. PATENT DOCUMENTS

| | | | | |
|---|---|---|---|---|
| 5,011,621 A | * | 4/1991 | Sullivan ....................... | 510/211 |
| 5,962,383 A | * | 10/1999 | Doyel et al. ................. | 510/164 |
| 6,017,862 A | * | 1/2000 | Doyel et al. ................. | 510/163 |
| 6,060,439 A | * | 5/2000 | Doyel et al. ................. | 510/164 |
| 6,281,189 B1 | * | 8/2001 | Heimann et al. ............ | 510/491 |

FOREIGN PATENT DOCUMENTS

| | | |
|---|---|---|
| DE | 3406500 A1 | 9/1985 |
| JP | 59-44205 B2 | 10/1984 |
| JP | 61-76599 A | 4/1986 |
| JP | 61-238900 A | 10/1986 |
| JP | 64-69699 A | 3/1989 |
| JP | 4-53899 A | 2/1992 |
| JP | 4-173900 A | 6/1992 |
| JP | 5-98294 A | 4/1993 |
| JP | 5-104539 A | 4/1993 |
| JP | 5-186798 A | 7/1993 |
| JP | 2533783 B2 | 6/1996 |
| JP | 10-146844 A | 6/1998 |
| JP | 10-338898 A | 12/1998 |
| JP | 11-92795 A | 4/1999 |
| JP | 2000-303095 A | 10/2000 |
| JP | 2001-214195 A | 8/2001 |
| WO | WO 92/22678 A | 12/1992 |

OTHER PUBLICATIONS

English language abstract of DE-A-3406500 (Sep. 12, 1985).
English language abstract of JP 1135710 (May 29, 1989).

* cited by examiner

*Primary Examiner*—Necholus Ogden
(74) *Attorney, Agent, or Firm*—Birch, Stewart, Kolasch & Birch, LLP

(57) ABSTRACT

A detergent for removing deposits on a mold for use in molding a thermoplastic resin, comprising limonene and ethanol is disclosed. Provided, is a detergent for removing mold deposits, said detergent being capable of easily removing deposits (the so-called mold deposits) and anticorrosive agents, releasing agents, lubricants and the like from the surface of a mold in the process of molding the thermoplastic resin. Furthermore, the detergent is preferable from the viewpoint of the work environment, and said detergent can be apply to a wide range of thermoplastic resins.

2 Claims, No Drawings

DETERGENT

This application is the national phase under 35 U.S.C. § 371 of PCT International Application No. PCT/JP01/10637 which has an International filing date of Dec. 5, 2001, which designated the United States of America.

TECHNICAL FIELD

The present invention relates to a detergent for removing deposits (the so-called mold deposits) and anticorrosive agents, releasing agents, lubricants and the like that are deposited on the surface of a mold in the process of molding a thermoplastic resin and a method for cleaning by the use thereof.

BACKGROUND ART

Excellent in moldability and productivity, thermoplastic resins have found their application in molding of a wide range of products such as electric and electronic parts, automobile parts, building materials, office supplies and the like, and the consumption of thermoplastic resin has been increasing year after year.

Ordinarily, a thermoplastic resin is molded into a desired shape by injection or extrusion molding. If the deposits, also known as the mold deposits, occur on the surface of the mold during the process, they are liable to be transferred to the surface of products, ruining the appearance of the products or leading to dimensional inaccuracy of the parts requiring highly accurate dimensions. Furthermore, if the mold deposits occur on the rugged mold surface processed by embossing, transferring of the ruggedness is significantly poor. These ruining of the appearance, deteriorating of the dimensional accuracy and poor transferring of the ruggedness may as well be caused by the residual anticorrosive agents, releasing agents, lubricants and the like.

In an effort to get rid of the effect of these residues, many molding processors clean the molds by dismantling them while consuming significant amount of time. In this way, the residues have been a big stumbling block against an attempt to improve productivity and reduce cost. Thus, traditionally, various detergents and cleaning methods for removing the residues from the molds have been proposed.

For example, JP-A-59-44205 describes a method for removing mold deposits in the process of molding polyoxymethylene by using a detergent composition comprising a benzyl alcohol and an aliphatic alcohol wherein the detergent is coated over the surface of the mold with a brush. JP-A-10-146844 describes a method for removing mold deposits with a solution comprising benzyl alcohol plus a solvent having at least one alcoholic hydroxyl group, wherein said solution is coated over the mold by spraying with the aid of a propellant. However, these detergents fail to exhibit a satisfactory cleaning effect depending upon the kind of molded resin used (for example, polyamide). Another problem is that they are governed by the organic rules of the Law for Industrial Safety and Health and the Regulations for Determining Work Environment in Japan. Under the circumstances, therefore, a detergent has been called for that has a cleaning method preferable in the work environment, which is less toxic and capable of being applied to a wider range of thermoplastic resins.

On the other hand, JP-A-61-238900, JP-A-61-76599, JP-A-5-186798, JP-A-11-92795 and the like disclose detergent compositions, in the role of aqueous detergents, containing limonene that have been used as perfume. These aqueous detergents have been found not to be always able to exhibit a satisfactory cleaning effect against oily deposits because the detergents alway contain approximately several % of water as the base. The aqueous detergents have been particularly poor in cleaning effect in the molds of the molding machine wherein a lot of oily deposits such as anticorrosive agent, lubricant, releasing agent and the like are lingering.

Furthermore, DE 3406500A1 discloses a detergent comprising limonene alone or limonene with N-methylpyrrolidone or the like added in a small amount and a method for removing residues on a mold after it is used to mold polyurethane, polystyrene and polyvinyl chloride, wherein said detergent is sprayed over the mold, allowed to work for 5 minutes, and then the residues are washed away with a halogenic solvent such as methylene chloride and the like. However, these methods also have the problem that they are not always able to exhibit a satisfactory cleaning effect, depending upon the kind of resin. When the molding of resin is restarted after the cleaning, a number of molding shots are required to stabilize the physical properties of the molded resin, resulting in poor efficiency. Furthermore, in the case where very intractable deposits have to be removed from the mold as a result of long continuous molding operations, the mere spraying of the detergents is not good enough. The mold is often immersed into a solution of detergents and cleaned by ultrasound. In such an event, these detergents take too long in dry wiping after the ultrasonic cleaning, giving rise to a problem of inefficiency.

Furthermore, JP-A-5-104539 discloses a detergent for a mold for resin molding work comprising an alcoholic organic solvent and a hydrocarbonaceous organic solvent. Herein, ethanol and propanol are used as the alcoholic organic solvent, while octane, xylene, kerosene and the like are used as the hydrocarbonaceous organic solvent. These detergents are capable of exhibiting a good effect in removing pollutants on a mold after the ordinary general-purpose resin is molded. However, their cleaning effect is not always satisfactory to remove deposits that are hardly removable if they occurr on the mold as a result of molding, for example, modified polyphenylenether (PPE) and the like, or to remove the likewise hardly removable deposits resulting from a very long time continuous molding of even the ordinary general-purpose resin such as acrylonitrile/butadiene/styrene (ABS) resin. Furthermore, the above-mentioned hydrocarbonaceous organic solvents are not always preferable from the viewpoint of the work environment.

Moreover, a mold detergent comprising limonene and isopropyl alcohol (tradename: SLIDE ON/CYCLE MOLD CLEANER, manufactured by SLIDE PRODUCTS, INC.) has been marketed in the U.S. The product, however, does not exhibit a good effect in removing the deposits depending upon a certain resin, and further isopropyl alcohol is not always preferable from the viewpoint of environment.

As described above, the detergents and cleaning methods answering the needs of market by combining the multiple excellent performances have not as yet been known. Certainly, the market has called for a detergent and a cleaning method capable of exhibiting the excellent removing effect against the deposits that are hardly dealt with by conventional detergents and methods, requiring a short span of time until the physical properties of the molded resin are stabilized when the molding is restarted after cleaning and being preferable from the viewpoint of work environment.

DISCLOSURE OF INVENTION

The present invention relates to a detergent and a cleaning method to be used for the purpose of removing oily deposits and the like. An object of the present invention is to provide a detergent for removing mold deposits and a method for removing the mold deposits, capable of easily removing the deposits (the so-called mold deposits) and anticorrosive agents, releasing agents and lubricants on the surface of the molds, particularly in the process of molding the thermoplastic resin, preferable in work environment, harmless to the human body and applicable to a wide range of thermoplastic resins.

The present inventors have made a detailed study by examining the components of mold deposits and investigating the relationship of the components incorporated into thermoplastic resins and the anticorrosive agents, releasing agents and lubricants with the components of the detergents, and the methods of coating the detergents over the molds uniformly. As a result, a very effective means of removing the mold deposits has been found. Furthermore, it has also been found that said means is effective in removing the oily deposits from whiteboards, windows, furnitures, tableware and the like, besides from the molds. In this way, the present inventors have found a detergent effective in removing deposits not only from metals but also from glass, resin, woods and the like, and the present invention has been completed on the basis of these findings.

The present invention is to provide a detergent comprising limonene and ethanol and a method for cleaning an article to be washed by coating the detergent over the article by spraying with the aid of a propellant. Furthermore, the present invention provides a detergent for removing deposits on the molds that are used in molding a thermoplastic resin and a method for removing the deposits from the surface of the molds used in molding a thermoplastic resin, comprising the step of cleaning said mold surface by coating the detergent over the mold surface by spraying with the aid of a propellant.

BEST MODE FOR CARRYING OUT THE INVENTION

The detergent of the present invention comprises limonene and ethanol. The limonene is available in two kinds of dextrorotary (D) and levorotary (L) compounds, and the term "limonene" used herein means either of them. These compounds can be used alone or in combination. From the viewpoint of the environment, a compound comprising D-limonene derived from citrus fruits as the main component is used most preferably.

The limonene is incorporated in a concentration of preferably 25% by weight~80% by weight, more preferably 30% by weight~50% by weight. In concentrations of 25% or more by weight, limonene can exhibit a satisfactory cleaning effect, while hardly deteriorating cleaning efficiency. In concentrations of 80% or less by weight, the detergents are not liable to remain in a cavity as the residue, requiring blank shots in a smaller number and contributing to the improvement of working efficiency.

Ethanol in the present invention is suitably mixed in an adequate amount by giving consideration to how much ethanol would be dissolved in mold deposits derived from a molding resin that should be removed by cleaning and how much ethanol would remain in a mold as a residue.

Furthermore, the cleaning method of the present invention is a method for removing deposits on a mold used in molding a thermoplastic resin, comprising the steps of coating the detergent over the surface of the mold by spraying with the aid of a propellant and cleaning the surface of the mold.

The propellant is very effective in coating the detergents over the surface of the mold uniformly. Generally, the propellant is gas called high-pressure gas, having a filling pressure of 0.1 kg/cm$^2$ or more when it is filled into a spray can. Specific examples of the propellant are air, nitrogen gas, argon gas, helium, $CO_2$, LPG, neon gas and the like. Of them, LPG is most adequate in consideration of the environmental pollution and from the viewpoint of handling safety. By using the propellant, said detergent can be coated on the surface of the mold uniformly even if the surface is in a complicated shape.

Examples of the thermoplastic resin for which the detergents of the present invention can be used after molding are acrylonitrile/butadiene/styrene (ABS) resin, acrylonitrile/styrene (AS) resin, styrene/butadiene resin, acrylonitrile/acrylate/styrene copolymer, vinyl chloride, polypropylene, polyethylene, polystyrene, polyamide, polymethylmethacrylate, polyacetal, ionomer, aminopolyacrylamide, fluorine resins, polyarylate, polyimide, polyetherimide, polyetheretherketone, polysulfone, polybutylene terephthalate (PBT), polyethylene terephthalate (PET), polyvinylidene chloride, polycarbonate, vinyl acetate, polyvinyl alcohol, polyvinyl ether, polyvinyl formal, modified PPE, modified polyphenylene oxide (PPO), polyphenylene sulfide, polymethyl pentene, liquid crystal polymer and the like. The present invention can exhibit a particularly good effect with the use of polyamide and modified PPE among them.

The main components of the deposits that occur on the molds when the resins are continuously molded are parts of additives or oligomers of the resins or the like. The additives include antioxidant agents, weathering agents, flame-retardants, antistatic agents, lubricants and the like that are incorporated into the resins in order to provide the resins with particular properties. The oligomers of the resin are different depending upon the kind of resin. Furthermore, as the example of other deposits, the anticorrosive agents preventing the molds from corroding, for example, those comprising an organic polymer compound as the main component, can be cited. These anticorrosive agents are suitably coated over the molds at the beginning or in the middle of the molding and parts of them are liable to remain on the surface of the mold as the residue in a subsequent process. Furthermore, releasing agents improving the releasability between the molded products and the molds, for example, those comprising vegetable oil and fat as the main component, may occasionally remain as the mold deposit. The mold deposit may as well be derived from the lubricants keeping the mold knockout pins in slidable condition, for example, those comprising a fluorine resin as the main component.

EXAMPLES 1~4 AND COMPARATIVE EXAMPLES 1~4

Cylindrical glasses (having an inner diameter of 46 mm, outer diameter of 50 mm, height of 50 mm and bottom thickness of 4 mm) were molded by using a "Styrac (Registered Trademark) ABS121" ABS resin made by ASAHI CHEMICAL INDUSTRY CO., LTD., on a "US-100E" injection molding machine made by Toshiba Machine Co., Ltd. at a cylinder temperature of 180° C. and a mold temperature of 40° C. In the glasses obtained respectively at the first shot and ten thousandth shot, the gloss was measured at the inner bottom of the glass by using a glossmeter. It was found that the glass molded at the first shot had a gloss of approximately 85%, whereas, in the glass obtained at the ten thousandth shot, the gloss went down to approximately 50%.

After the ten thousandth shot, the operations of the molding machine were switched from automatic to manual, keeping the mold in a state of being opened. The detergents listed in Table 1 and LPG, a propellant, were filled into spray cans equipped with nozzles similar to those of hair spray and sprayed over the mold of the molding machine for 5 seconds. The mold was in the shape of a cylinder, having a structure wherein the detergents could not be uniformly coated within the cavity unless they were sprayed with the aid of LPG, the propellant. The effect of the propellant was found to work very favorably in such an otherwise unreachable structure. After said spraying, the 4 blank shots (waste shots) were taken, and then the gloss was measured in the molded product at the 5th shot in the similar way and the so obtained value was termed as the gloss of the molded product after spraying.

The results are shown in Table 1.

Meanwhile, the gloss of the molded products was measured with the use of a "Model.VG-10" digital deviation glossmeter made by Nihon Denshoku Co., Ltd. at an angle of incidence at 60°.

As is evident from Table 1, it was found with the use of ABS as the molding resin that the detergents of the present invention (Examples 1~4) got the molded product after spraying to have a gloss of approximately 85% in the same way as the conventional detergent (Comparative Example 2). The detergents of the present invention could return the gloss to almost as good a state as immediately after the molding when the mold deposits were not existent. It was also found that a detergent containing ethanol alone (Comparative Example 1), a detergent containing IPA/limonene (Comparative Example 3) and an aqueous detergent (Comparative Example 4) were inferior to those of the present invention in the degree of regaining the gloss when the molded resin was ABS.

EXAMPLE 5~8 AND COMPARATIVE EXAMPLES 5~8:

Testing was conducted by repeating the procedure of Example 1, except that "LEONA (Registered Trademark) 1300 S", a polyamide 66 resin made by ASAHI CHEMICAL INDUSTRY CO., LTD. was used as the molded resin and the cylinder temperature was 280° C. Furthermore, sensory testing was also conducted for the odor of each detergent with a panel of 10 people. The results of testing are shown in Table 2.

TABLE 1

| | Detergent | | Gloss of Molded Product (%) | | |
|---|---|---|---|---|---|
| No. | Kind | Limonene Concentration (Wt. %) | 1st Shot | 10,000th Shot | After Spraying |
| Example 1 | Ethanol/Limonene | 90 | 86 | 51 | 82 |
| Example 2 | Ethanol/Limonene | 75 | 85 | 48 | 84 |
| Example 3 | Ethanol/Limonene | 50 | 86 | 50 | 86 |
| Example 4 | Ethanol/Limonene | 25 | 86 | 53 | 84 |
| Comparative Example 1 | Ethanol | 0 | 84 | 49 | 64 |
| Comparative Example 2 | IPA/Benzyl Alcohol | 25* | 85 | 51 | 85 |
| Comparative Example 3 | IPA/Limonene | 50 | 85 | 49 | 60 |
| Comparative Example 4 | Aqueous Detergent (Orange Oil) | ** | 86 | 50 | 55 |

*The concentration of benzyl alcohol
**Comprising water/surfactant/limonene as the main components.

TABLE 2

| | Detergent | | Gloss of Molded Product | | | Overall Evaluation of Odor ○:Good △:Slightly discomfort X:Discomfort |
|---|---|---|---|---|---|---|
| No. | Kind | Limonene Concentration (Wt. %) | 1st Shot | 10,000th Shot | After Spraying | |
| Example 5 | Ethanol/Limonene | 90 | 84 | 51 | 82 | △ |
| Example 6 | Ethanol/Limonene | 75 | 86 | 48 | 84 | △~○ |

TABLE 2-continued

| | Detergent | | Gloss of Molded Product | | | Overall Evaluation of Odor ○:Good △:Slightly discomfort X:Discomfort |
|---|---|---|---|---|---|---|
| No. | Kind | Limonene Concentration (Wt. %) | 1st Shot | 10,000th Shot | After Spraying | |
| Example 7 | Ethanol/ Limonene | 50 | 84 | 50 | 85 | ○ |
| Example 8 | Ethanol/ Limonene | 25 | 86 | 50 | 78 | ○ |
| Comparative Example 5 | Limonene | 100 | 85 | 51 | 84 | △ |
| Comparative Example 6 | Ethanol | 0 | 85 | 49 | 64 | ○ |
| Comparative Example 7 | IPA/ Benzyl Alcohol | 25* | 84 | 49 | 66 | X~△ |
| Comparative Example 8 | IPA/ Limonene | 50 | 85 | 50 | 62 | △ |

*The concentration of benzyl alcohol

As is evident from Table 2, it was found with the use of polyamide as the molding resin that the detergents of the present invention (Examples 5~8) got the molded products after spraying to have a gloss of 78~85%. The detergents of the present invention could return the gloss to almost as good a state as immediately after the molding when the mold deposits were not existent, superior to the conventional detergent (Comparative Example 7) in the degree of regaining the gloss. It was also found that the detergents of the present invention were better than the conventional detergent (Comparative Example 7) in terms of odor.

A detergent containing ethanol alone (Comparative Example 6) and a detergent containing IPA/limonene (Comparative Example 8) were found to be inferior to those of the present invention in the degree of regaining the gloss and unsatisfactory in terms of odor.

EXAMPLES 9~12 AND COMPARATIVE EXAMPLES 9~12

Testing was conducted by repeating the procedure of Example 1, except that "XYRON (Registered Trademark) X191", a modified PPE resin made by ASAHI CHEMICAL INDUSTRY CO., LTD. was used as the molding resin and the cylinder temperature was 270° C. The results of testing are shown in Table 3.

TABLE 3

| | Detergent | | Gloss of Molded Product | | |
|---|---|---|---|---|---|
| No. | Kind | Limonene Concentration (Wt. %) | 1st Shot | 10,000th Shot | After Spraying |
| Example 9 | Ethanol/ Limonene | 90 | 86 | 49 | 77 |
| Example 10 | Ethanol/ Limonene | 75 | 85 | 49 | 82 |
| Example 11 | Ethanol/ Limonene | 50 | 85 | 51 | 85 |
| Example 12 | Ethanol/ Limonene | 25 | 86 | 50 | 77 |
| Comparative Example 9 | Limonene | 100 | 84 | 48 | 70 |
| Comparative Example 10 | Ethanol | 0 | 84 | 49 | 64 |
| Comparative Example 11 | IPA/ Benzyl Alcohol | 25* | 85 | 50 | 65 |
| Comparative Example 12 | IPA/ Limonene | 50 | 85 | 49 | 61 |

*The concentration of benzyl alcohol

As is evident from Table 3, it was found with the use of modified PPE as the molding resin that the detergents of the present invention (Examples 9~12) got the molded products after spraying to have a gloss of 77~85%. The gloss could return to almost as good a state as immediately after the molding when the mold deposits were not existent. The detergents of the present invention were superior to the conventional detergent (Comparative Example 11), a detergent of IPA/limonene (Comparative Example 12) and an ethanol detergent (Comparative Example 10) in the degree of regaining the gloss.

EXAMPLES 13~14 AND COMPARATIVE EXAMPLE 13

"Aceguard (Registered Trademark)", an anticorrosive agent made by Toyo Chemical Co., Ltd. was previously coated by spraying over the mold that should be used in molding the same cylindrical glasses as in Example 1. Cylindrical glasses were molded by using the same ABS resin as in Example 1 and under the same conditions as those of Example 1. One blank shot (waste shot) was taken, and then in the molded product (glass) at the second shot, the gloss was measured at the inner bottom in the same way as in Example 1, and the so obtained value was termed as the gloss before cleaning.

Furthermore, "Aceguard (Registered Trademark)", an anticorrosive agent made by Toyo Chemical Co., Ltd. was previously coated by spraying over the mold that should be used in molding the same cylindrical glasses as in Example 1. Then, the detergents listed in Table 4 were sprayed over the mold with the aid of LPG (propellant) in the same way as in Example 1, and the mold was dry-wiped with "ASACLINWIPER (Registered Trademark)", an unwoven fabric made by ASAHI CHEMICAL INDUSTRY CO., LTD. Thereafter, cylindrical glasses were molded by using the same ABS resin as in Example 1 and under the same conditions as those of Example 1. One blank shot (waste shot) was made, and then in the molded product (glass) at the second shot, the gloss was measured at the inner bottom in the same way as in Example 1, and the so obtained value was termed as the gloss after cleaning.

The results are shown in Table 4.

TABLE 4

| | Detergent | | Gloss of Molded Product (%) | |
|---|---|---|---|---|
| No. | Kind | Limonene Concentration (Wt. %) | Before Cleaning | After Cleaning |
| Example 13 | Ethanol/ Limonene | 50 | 47 | 86 |
| Example 14 | Ethanol/ Limonene | 25 | 54 | 80 |
| Comparative Example 13 | Ethanol | 0 | 52 | 66 |

EXAMPLES 15~16 AND COMPARATIVE EXAMPLE 14

Evaluation was conducted by repeating the procedure of Example 13, except that "PAINTABLE (Registered Trademark)", a releasing agent made by Toyo Chemical Co., Ltd. was coated by spraying in stead of the anticorrosive agent. The results are shown in Table 5.

TABLE 5

| | Detergent | | Gloss of Molded Product (%) | |
|---|---|---|---|---|
| No. | Kind | Limonene Concentration (Wt. %) | Before Cleaning | After Cleaning |
| Example 15 | Ethanol/ Limonene | 50 | 51 | 85 |
| Example 16 | Ethanol/ Limonene | 25 | 49 | 79 |
| Comparative Example 14 | Ethanol | 0 | 53 | 64 |

EXAMPLES 17~18 AND COMPARATIVE EXAMPLE 15

Evaluation was conducted by repeating the procedure of Example 16, except that "THE.KING (Registered Trademark)", a lubricant made by Toyo Chemical Co., Ltd. was coated by spraying in stead of the anticorrosive agent. The results are shown in Table 6.

TABLE 6

| | Detergent | | Gloss of Molded Product (%) | |
|---|---|---|---|---|
| No. | Kind | Limonene Concentration (Wt. %) | Before Cleaning | After Cleaning |
| Example 17 | Ethanol/ Limonene | 50 | 50 | 86 |
| Example 18 | Ethanol/ Limonene | 25 | 46 | 80 |
| Comparative Example 15 | Ethanol | 0 | 52 | 63 |

EXAMPLES 19~21 AND COMPARATIVE EXAMPLE 16

The detergents listed in Table 7 were sprayed over the mold at 60° C. for 5 seconds on the "IS-55" injection molding machine made by Toshiba Machine Co., Ltd. Thereafter, ten shots of the dumbbell specimens for use in the ISO test methods were molded at 240° C. by using the machine and "STYRAC (Registered Trademark)", an ABS resin made by ASAHI CHEMICAL INDUSTRY CO., LTD. After the so obtained specimens were subjected to conditioning at atmospheric temperature of 23° C. and under a humidity of 50% for 48 hours, their tensile physical properties were measured, examining from what shot on the values of physical properties would return to the level of the blank values. The numbers of shots required until the return is accomplished are termed as the tensile strength Oked number of shots and the extension Oked number of shots. The results are shown in Table 7.

TABLE 7

| | Detergent | | Tensile Physical Propertie of Molded Product | |
|---|---|---|---|---|
| No | Kind | Limonene Concentration (Wt. %) | Tensile Strength Oked Number of Shots | Extension Oked Number of Shots |
| Example 19 | Ethanol/ Limonene | 75 | 10 | 10 |
| Example 20 | Ethanol/ Limonene | 50 | 5 | 5 |
| Example 21 | Ethanol/ Limonene | 25 | 4 | 5 |
| Comparative Example 16 | Limonene | 100 | 15 | 16 |

As is evident from Table 7, it was found that 16 shots were required until the tensile physical properties returned to the normal value (blank value) in a limonene concentration of 100% (Comparative Example 16). However, only 5 shots were required to do so in a limonene concentration of 50% or less (Examples 20 and 21).

EXAMPLE 22 AND COMPARATIVE EXAMPLES 17~21

Twenty thousand shots of cylindrical glasses (having an inner diameter of 46 mm, outer diameter of 50 mm, height of 50 mm and bottom thickness of 4 mm) were molded by using "STYRAC (Registered Trademark) ABS121", an ABS resin made by ASAHI CHEMICAL INDUSTRY CO., LTD. on the "IS-100E" injection molding machine made by Toshiba Machine Co., Ltd. Molding was conducted at a cylinder temperature of 240° C. and a mold temperature of 40° C. In the glasses obtained respectively at the 1st shot and at the twenty thousandth shot, the gloss was measured at the inner bottom.

It was found that the molded product at the 1st shot had a gloss of approximately 85% whereas, in the glass at the twenty thousandth shot, the gloss went down to approximately 20%. After the twenty thousandth shot, the mold was removed from the molding machine, immersed into an ultrasonic cleaning machine SH1820 made by Branson Corporation wherein the detergents listed in Table 8 were incorporated and cleaned by ultrasound at 40° C. for 2 hours. Then, the mold was fitted into the molding machine and dry-wiped with the ASACLINWIPER.

The length of time required for dry wiping was measured, then 4 blank shots (waste shots) were made and the gloss of the molded product at the fifth shot was likewise measured. The results are shown in Table 8.

EXAMPLE 23

Notes were written on a whiteboard with PM-B102D, a marking ink (made by KOKUYO) comprising alcoholic ink that is intended for use in whiteboards. Then, the notes were lightly wiped with a cloth infiltrated with a detergent composed of 50% by weight of limonene and 50% by weight of ethanol. As a result, the notes were as cleanly effaced as if an accompanying whiteboard eraser dealt with them, leaving a pleasurable, lingering scent behind.

INDUSTRIAL APPLICABILITY

As described above, the present invention can remove the deposits on the molds (the so-called mold deposits) and anticorrosive agents, releasing agents and lubricants from the surface of the molds by cleaning. In this way, the present invention can get the molds after molding back into the molds without ruining the appearance or without deterioration of dimensional accuracy and having the excellent capability to transfer to the surface of the molded products. Furthermore, the present invention can save a lot of time required for cleaning the molds by disassembling them, contributing to improvement in productivity and reduction of cost. Moreover, the present invention is preferable from the viewpoint of the work environment because the materials used comprise limonene that is derived from natural plant resources and can be used as a perfume as well and

TABLE 8

| | Detergent | | Gloss of Molded Product (%) | | | |
| --- | --- | --- | --- | --- | --- | --- |
| No. | Kind | Ethanol Concentration (Wt. %) | 1st Shot | 20,000th Shot | After Ultrasonic Cleaning | Time Required for Dry Wiping |
| Example 22 | Ethanol/Limonene | 50 | 85 | 20 | 85 | 3 min. |
| Comp. Example 17 | Limonene | 0 | 86 | 19 | 82 | 20 min. |
| Comp. Example 18 | Ethanol/n-Octane | 50 | 85 | 21 | 46 | 3 min. |
| Comp. Example 19 | Ethanol/Kerosene | 50 | 86 | 19 | 42 | 6 min. |
| Comp. Example 20 | Ethanol/Xylene | 50 | 85 | 20 | 44 | 3 min. |
| Comp. Example 21 | Ethanol | 100 | 85 | 21 | 26 | 2 min. |

As is evident from Table 8, even with the mold after molding of 20,000 shots that was far dirtier than in the case of Example 1, the detergent of the present invention (Example 22) could get the molded product after ultrasonic cleaning to have a gloss of 85%. The gloss could return to almost as good a state as the clean mold immediately after the molding. Furthermore, the degree of regaining the gloss was found to be unsatisfactory with a detergent containing ethanol alone (Comparative Example 21) and those of ethanol/octane, ethanol/kerosene and ethanol/xylene (Comparative Examples 18~20) and the detergents of the present invention were found to be superior to them. Furthermore, a detergent containing limonene alone (Comparative Example 17) could get the molded product after ultrasonic cleaning to have as much a gloss as 82% but took very long, or 20 minutes, almost 3 times as long as the detergents of the present invention to dry-wipe, evidencing that the detergent of limonene alone is poor in working efficiency.

ethanol, unharmful to the human body. The present invention also can exhibit excellent cleaning and removing effects against, for example, window glass, whiteboards and the like, besides against the molds of the molding machines.

The invention claimed is:

1. A detergent composition consisting of:
   25% by weight to 80% by weight of limonene; and
   20% by weight to 75% by weight of ethanol.

2. A detergent composition consisting of:
   a mixture consisting of 25% by weight to 80% by weight of lirnonene and 20% by weight to 75% by weight of ethanol; and
   propellant.

* * * * *